US008817595B2

(12) United States Patent
Hautakorpi et al.

(10) Patent No.: US 8,817,595 B2
(45) Date of Patent: Aug. 26, 2014

(54) OVERLAY NETWORK NODE AND OVERLAY NETWORKS

(75) Inventors: Jani Hautakorpi, Masala (FI); Jouni Mäenpää, Nummela (FI); Markus Meriläinen, Kauniainen (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 241 days.

(21) Appl. No.: 12/867,749

(22) PCT Filed: Jan. 14, 2009

(86) PCT No.: PCT/EP2009/050351
§ 371 (c)(1),
(2), (4) Date: Aug. 13, 2010

(87) PCT Pub. No.: WO2009/100961
PCT Pub. Date: Aug. 20, 2009

(65) Prior Publication Data
US 2010/0329268 A1    Dec. 30, 2010

Related U.S. Application Data

(60) Provisional application No. 61/028,331, filed on Feb. 13, 2008.

(51) Int. Cl.
*G01R 31/08*   (2006.01)
(52) U.S. Cl.
USPC ............ 370/218; 370/217; 370/235; 370/400
(58) Field of Classification Search
None
See application file for complete search history.

(56) References Cited

U.S. PATENT DOCUMENTS

| 2002/0174207 | A1* | 11/2002 | Battou ......................... 709/223 |
| 2003/0126287 | A1* | 7/2003 | Charny et al. ................ 709/239 |
| 2003/0233595 | A1* | 12/2003 | Charny et al. .................... 714/4 |
| 2004/0022194 | A1* | 2/2004 | Ricciulli ....................... 370/238 |
| 2004/0095946 | A1* | 5/2004 | Baker .......................... 370/405 |
| 2007/0104115 | A1* | 5/2007 | Decasper et al. ............. 370/254 |
| 2007/0112975 | A1* | 5/2007 | Cassar .......................... 709/239 |
| 2007/0121570 | A1  | 5/2007 | Takeda et al. |
| 2008/0181135 | A1* | 7/2008 | Yalagandula et al. ........ 370/255 |
| 2008/0225780 | A1* | 9/2008 | McCormick et al. ......... 370/328 |
| 2009/0232030 | A1* | 9/2009 | Suzuki et al. ................. 370/256 |

FOREIGN PATENT DOCUMENTS

EP        1 164 753 A    12/2001

OTHER PUBLICATIONS

Leong; "EpiChord: Paralielizing the Chord Lookup Algorithm with Reactive Routing State Management"; Proceedings of the 12th International Conference on Networks 2004 (ICON 2004), Singapore; Nov. 2004.

(Continued)

*Primary Examiner* — Donald Mills

(57) ABSTRACT

An overlay network node is arranged to provide robust reply routing for requests and replies travelling over the network. Each node comprises first means which forwards each request originating in a source node and destined for destination node. The node comprises second means which redirect replies if the node from which the corresponding requests were received is no long accessible. The reply is, for example, turned into a request containing the reply as its payload and is returned towards the source node according to the rules used for forwarding the requests.

20 Claims, 4 Drawing Sheets

(56) References Cited

OTHER PUBLICATIONS

Kademlia (P. Maymounkov and D. Mazieres, "Kademlia: A Peer-to-peer Information System Based on the XOR Metric", In 1$^{st}$ International Workshop on Peer-to-peer Systems 2009.
S. Ratnasamy, P. Francis. M. Handley, R. Karp, and S. Shenker, "A Scalable Content-Addressable Network", In proceedings of ACM SIGCOMM 2001.
R. Stoica, D. Morris, M. Karger, F. Kaashoek, and H. Balakrishnan, "Chord: A Scalable Peer-to-peer Lookup Service for Internet Applications," in Proceedings of the ACM SIGCOMM '01 Conference, San Diego, California. Aug. 2001, pp. 149.
J. Rosenberg. H. Schulzrinne, G. Camarillo, A. Johnston, J. Peterson, R. Sparks, M. Handley, and E. Schooler. "SIP: Session Initiation Protocol," RFC 3261 (Proposed Standard), Internet Engineering Task Force, Jun. 2002.
Homepage of the P2PSIP working group at the Internet Engineering Task Force, http://www.letf.org/html.charters/p2psip-charter.html (Referenced Jan. 17, 2008).
S. Baset, H. Schulzrinne, and M. Matuszewski, Peer-to-Peer Protocol (P2PP), Nov. 2007, draft-baset-p2psip-p2pp-01, http://www.letf.org/internet-drafts/draft-baset-p2psip-p2pp-01.txt (Referenced Jan. 17, 2008).
D. Bryan, S. Basel, M.Matuszewski, and H.Sinnreich, P2PSIP Protocol Framework and Requirements, Jul. 2007, draft-bryan-p2psip-requirements-00, http://tools.letf.org/id/draft-bryan-p2psip-requirements-00.txt (Referenced Jan. 17, 2008).
D. Bryan, E. Shim, and B. Lowekamp, Use Cases for Peer-to-Peer Session Initiation Protocol (P2P SIP), Jul. 2007, draft-bryan-p2psip-usecases-00, http://www.watersprings.org/pub/id/draft-bryan-p2psip-usecases-00.txt (Referenced Jan. 17, 2008).
J. Hautakorpi, G. Camarillo, and J. Koskela, Utilizing HIP (Host Identity Protocol) for P2PSIP (Peer-to-peer Session Initiation Protocol), Nov. 2007, draft-hautakorpi-p2psip-with-hip-01.txt, http://www.ieff.org/internet-drafts/draft-hautakorpi-p2psip-with-hip-01.txt (Referenced Jan. 17, 2008).
C. Jennings. B. Lowekamp, E. Rescoria, and J. Rosenberg, REsource LOcation and Discovery (Reload), Nov. 2007, draft-bryan-p2psip-reload-02, http:www.ietf.org/internet-drafts/draft-bryan-p2psip-reload-02.txt (Referenced Jan. 17, 2008).
M. Matuszewski, J-E. Ekberg, and P. Laitinen, Security requirements in P2PSIP, Nov. 2007, draft-matuszewski-p2psip-security-requirements-02, http://www.ietf.org/internet-drafts/draft-matuszewski-p2psip-security-requirements-02.txt (Referenced Jan. 17, 2008).
Martin Gudgin, Marc Hadley, Noah Mendelsohn, Jean-Jacques Moreau, Henrik Fryslyk Nielsen, Anish Karmarkar, and Yves Leon, SOAP Version 1.2 Part 1: Messaging Framework (Second Edition), W3C Recommendation, Apr. 2007, http://www.w3.org/TR/2007/REC-soap12-part1-20070427/.

\* cited by examiner

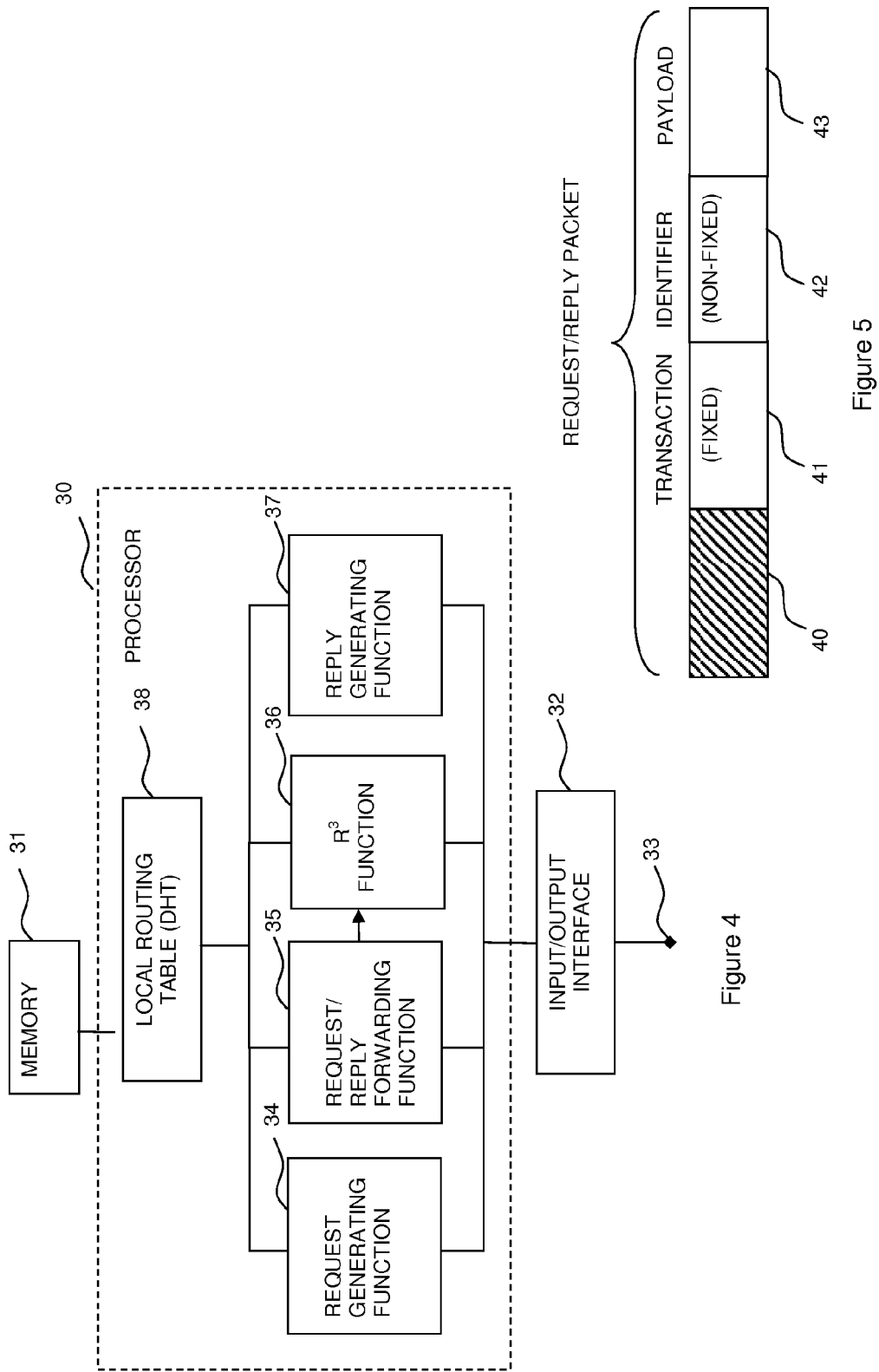

OVERLAY NETWORK NODE AND OVERLAY NETWORKS

This application claims the benefit of U.S. Provisional Application No. 61/028,331, filed Feb. 13, 2008, the disclosure of which is fully incorporated herein by reference.

TECHNICAL FIELD

The present invention relates to an overlay network node and to an overlay network including such a node. Such a node may provide robust reply routing for such overlay networks.

BACKGROUND

Operating Environment and Related Technologies

In the past years, there has been a lot of research interest towards overlay networks which, in this context, mean networks where overlay routing is done above the internet protocol layer (IP) layer, and especially toward Distributed Hash Table (DHT) algorithms, such as EpiChord (B. Leong, B. Liskov, and E. Demaine, "EpiChord: Parallelizing the Chord Lookup Algorithm with Reactive Routing State Management", in Proceedings of the IEEE International Conference on Networks (ICON 2004), volume 1, 2004), Kademlia (P. Maymounkov and D. Mazieres, "Kademlia: A Peer-to-peer Information System Based on the XOR Metric", In $1^{st}$ International Workshop on Peer-to-peer Systems 2009), CAN (S. Ratnasamy, P. Francis, M. Handley, R. Karp, and S. Shenker, "A Scalable Content-Addressable Network", In proceedings of ACM SIGCOMM 2001) and Chord (R. Stoica, D. Morris, M. Karger, F. Kaashoek, and H. Balakrishnan, "Chord: A Scalable Peer-to-peer Lookup Service for Internet Applications," in Proceedings of the ACM SIGCOMM '01 Conference, San Diego, Calif., August 2001, pp. 149). Typical peer-to-peer (P2P) networks make use of an overlay routing network on top of the IP routing network. Such overlay networks allow the storage locations of files to be reached based upon an overlay network key.

In the case of Distributed Hash Tables (DHT), the key is a hash of a filename. DHTs have the property that the keys are evenly spread across the address space and the allocation of key ranges to specific nodes in the overlay network ("supernodes") therefore results in the file storage load also being evenly spread. Most part of the research efforts have been focused on developing and enhancing the DHT algorithm itself and not so much effort has been focused on deploying DHTs to existing communication networks. However, there are a number of applications that utilize DHTs in the Internet, such as file sharing (e.g. eMule and BitTorrent) and interpersonal communication applications (e.g. Skype).

Interpersonal communication is currently done with non-standardized applications, like Skype™, but in the near future it will be possible to use standardized technology, namely P2PSIP (Peer-to-Peer Session Initiation Protocol), for communication in overlay networks.

Even though the procedure described herein, namely Robust Reply Routing for Overlay Networks ($R^3$), can be used with various overlay networks, perhaps the most prominent case is its use with P2PSIP technology. The idea in P2PSIP is to combine SIP (Session Initiation Protocol) (J. Rosenberg, H. Schulzrinne, G. Camarillo, A. Johnston, J. Peterson, R. Sparks, M. Handley, and E. Schooler, "SIP: Session Initiation Protocol," RFC 3261 (Proposed Standard), Internet. Engineering Task Force, June 2002) and P2P (Peer-to-peer) technologies in a novel manner. Although it will be possible to build isolated P2PSIP networks, it is expected that a number of such networks will be connected via gateways to existing SIP-based networks, such as the IP Multimedia Subsystem (IMS). This way, IMS users and P2PSIP users will be able to communicate with each other seamlessly.

P2PSIP technology is currently being standardized in the IETF (Internet Engineering Task Force). The P2PSIP working group (Homepage of the P2PSIP working group at the Internet Engineering Task Force, (Referenced Jan. 17, 2008)) was chartered in March 2007, Despite the fact that the P2PSIP working group has not existed for very long, there are already several drafts, for example S. Baset, H. Schulzrinne, and M. Matuszewski, Peer-to-Peer Protocol (P2PP), November 2007, draft-baset-p2 psip-p2 pp-01, (Referenced Jan. 17, 2008); D. Bryan, S Baset, M. Matuszewski, and H. Sinnreich, P2PSIP Protocol Framework and Requirements, July 2007, draft-bryan-p2 psip-requirements-00, (Referenced Jan. 17, 2008); D. Bryan, E. Shim, and B. Lowekamp, Use Cases for Peer-to-Peer Session Initiation Protocol (P2P SIP), July 2007, draft-bryan-p2 psip-usecases-00, (Referenced Jan. 17, 2008); J. Hautakorpi, G. Camarillo, and J. Koskela, Utilizing HIP (Host Identity Protocol) for P2PSIP (Peer-to-peer Session Initiation Protocol), November 2007, draft-hautakorpi-p2 psip-with-hip-01.txt, (Referenced Jan. 17, 2008); C. Jennings, B. Lowekamp, E. Rescorla, and J. Rosenberg, REsource LOcation And Discovery (RELOAD), November 2007, draft-bryan-p2 psip-reload-02, (Referenced Jan. 17, 2008); and M. Matuszewski, J-E. Ekberg, and P. Laitinen, Security requirements in P2PSIP, November 2007, draft-matuszewski-p2 psip-security-requirements-02, (Referenced Jan. 17, 2008), targeted for P2PSIP.

Problems with Existing Solutions

Reply routing in overlay networks is typically done by utilizing intermediary nodes. Today there exist two different reply routing mechanisms:
1) Reply routing mechanism used in existing request/reply protocols, such as in SIP and in Simple Object Access Protocol (SOAP) (Martin Gudgin, Marc Hadley, Noah Mendelsohn, Jean-Jacques Moreau, Henrik Frystyk Nielsen, Anish Karmarkar, and Yves Lafon, SOAP Version 1.2 Part 1: Messaging Framework (Second Edition), W3C Recommendation, April 2007)
2) Simple reply routing mechanism used in existing DHT-algorithm implementations.

Either of these reply routing mechanisms can utilize a soft-state in intermediary nodes (e.g. written by the corresponding request) or state in reply messages (cf. Via headers in SIP). The placement of state information does not make a considerable difference in this context.

The problem with mechanism 1) is that those reply mechanisms are not developed for networks with non-robust intermediary nodes. It is noteworthy that DHT algorithms, and applications based on them, are typically executed in non-robust endpoints, such as laptops or mobile phones. Hence, it may be assumed that failures in reply routing are quite common. In a typical DHT-based overlay network, the amount of intermediate nodes between the sender and the final recipient of a message can be up to log(N), where N is the total number of nodes in the overlay network. Thus, in a large P2P network (such as a world-wide P2PSIP telephony network), the amount of intermediate hops can become rather large so that the probability of intermediate node failure is higher and its impacts are more pronounced than e.g. in a traditional SIP network.

The problem with mechanism 2) is that it is vulnerable to intermediate node failures. If an intermediate node fails while the reply is in transit, the only way to remedy the failed request/reply transaction is for the original sender to resend the request after a timeout. This kind of model for failure tolerance is very inefficient and especially ill-fitted for inter-personal communication. Furthermore, existing reply routing mechanisms in overlay networks (e.g. the ones used in P2P networks such as eMule and in BitTorrent) are not well-suited to environments with Network Address Translators (NATs), such as the Internet.

Another somewhat related technology is Internet Indirection Infrastructure (i3). However, the reply routing is not so significant an issue in i3 as it is in P2PSIP because, in i3, only the initial connection setup goes via multiple hops in an overlay whereas, in P2PSIP, most of the signaling goes via multiple hops in an overlay. Furthermore, the implementation from i3 uses iterative routing and therefore the reply routing is quite straightforward and not well suited to environments with NAT devices.

Description of the Existing Reply Routing Mechanism

The existing reply routing mechanism used by recursive DHTs is illustrated in FIG. 1 of the accompanying drawings. In this mechanism, replies follow the same path 5-8 through the overlay network as the request did (1-4). The state information required for reply routing can be stored either in each intermediary node as a soft-state or as a path definition in the reply message itself (cf. Via headers in SIP). In FIG. 1, nodes are presented as boxes (S=source, Ix=Intermediary x, D=destination), requests as arrows, replies as dashed arrows, and existing connections as tubes. The overlay network is presented as a large circle. Although the overlay network is presented in Chord-like fashion (that is, using a ring-like topology), the $R^3$ is suited to almost all overlay network technologies and DHT-algorithms.

The problem with the recursive model illustrated in FIG. 1 is that the reply cannot be routed back to the node S if any one of the intermediate nodes (e.g. I1, I2) becomes unreachable. As an example, assume that the node I1 becomes unreachable after it has forwarded the request to the node I2. There can be various reasons for unreachability of a node. For example, batteries may have run out, an operating system may have crashed, or connectivity may have been lost (e.g. due to node mobility). Also, instead of becoming unreachable, the node I1 may simply decide to leave the overlay gracefully soon after having forwarded the request, meaning that is no longer available when the reply should be forwarded back towards the node S.

In any of these scenarios, the reply from the node D cannot be routed back to the node S because the path (1-4) that the request followed through the overlay network no longer exists. Further, it may take a long time before the node S realizes that the request/reply transaction has failed. Because the reply cannot find its way back to the node S, the node S has to wait for a transaction timeout to occur before it can reattempt to transmit the request. If the purpose of the P2P request/reply transaction is e.g. to find out the contact information of a callee during call establishment, then this kind of waiting directly increases the call setup delay.

In addition to the recursive routing model illustrated in FIG. 1, it is also possible to consider using semi-recursive (D sends a reply directly to S) or iterative (S contacts all intermediary nodes one by one) overlay routing models in FIG. 1. However, the recursive overlay routing is the only sufficient model for environments where Network Address Translators (NATs) exist, such as the Internet. The semi-recursive routing model fails in the presence of NATs, because if the node D (i.e. the destination node) is behind a NAT, the NAT will typically drop the incoming reply if it is sent directly from S to D without involving the intermediate nodes. On the other hand, the iterative routing model is inefficient in NATed environments, because a NAT hole-punching technique would need to be used separately for each node along the path between D and S when routing the request.

SUMMARY

According to a first aspect of the invention, there is provided an overlay network node comprising: first means for forwarding, from a preceding node of the overlay network, a request originating in a source node of the overlay network and destined for a destination node of the overlay network; and second means, responsive to the preceding node being unavailable, for forwarding a reply, originating in the destination node and destined for the source node, to the request via another node of the overlay network, different from the preceding node, towards the source node.

The second means may be arranged to convert the reply into a further request destined for the second node. The second means may be arranged to covert the reply into a payload of the further request.

The node may comprise an overlay routing table, the second means being arranged to select the other node from the overlay routing table. The second means may be arranged to select the other node as nearest the source node according to a proximity metric of the overlay routing table.

The source node may be arranged to provide a transaction identifier in the request and each of the first and second means may be arranged not to change at least part of the transaction identifier representing the end-to-end path of the request and the reply. Each of the first and second means may be arranged to update a non-fixed part of the transaction identifier in accordance with a local part of a node path of the request and reply through the overlay network. The second means may be arranged to identify the preceding node from the non-fixed part of the transaction identifier.

As an alternative the first means may be arranged to store a representation of the identity of the preceding node and the second means may be arranged to identify the preceding node from the stored representation.

The node may comprise a router of the overlay network.
The node may comprise a network server.

According to a second aspect of the invention, there is provided an overlay network comprising at least one node according to the first aspect of the invention.

The network may comprise a peer-to-peer network. The network may comprise a peer-to-peer session initiation protocol network.

According to a third aspect of the invention, there is provided a method of routing a reply in an overlay network comprising, in a node of the overlay network: forwarding, from a preceding node of the overlay network, a request originating in a source node of the overlay network and destined for a destination node of the overlay network; and, in response to the preceding node being unavailable, forwarding a reply, originating in the destination node and destined for the source node, to the request via another node of the overlay network, different from the preceding node, towards the source node.

The second means may convert the reply into a further request destined for the source node. The second means may convert the reply into a payload of the further request.

The second means may select the other node from an overlay routing table. The second means may select the other node as nearest the source node according to a proximity metric of the overlay routing table.

The source node may provide a transaction identifier in the request and each of the first and second means may not change at least part of the transaction identifier representing the end-to-end path of the request and the reply. The first and second means may update a non-fixed part of the transaction identifier in accordance with a local part of a node path of the request and reply through the overlay network. The second means may identify the preceding node from the non-fixed part of the transaction identifier.

The first means may store a representation of the identifier of the preceding node and the second means may identify the preceding node from the stored representation.

According to a fourth aspect of the invention, there is provided a program for programming a computer to perform a method according to the third aspect of the invention.

According to a fifth aspect of the invention, there is provided a computer-readable medium containing a program according to the fourth aspect of the invention.

It is thus possible to provide a "Robust Reply Routing for Overlay Networks ($R^3$)" in the form of a mechanism which allows an overlay network to recover rapidly from intermediate node failures. This kind of failure tolerance is very important when overlay networks are deployed in real-life communication networks, such as the Internet or third generation (3G) networks. The need for failure tolerance is emphasized by the fact that intermediary nodes in overlay networks are typically non-robust endpoints.

It is further possible to introduce into routers of an overlay routing network a functionality that introduces a fallback reply routing mechanism in the event that a recursive routing mechanism fails. This fallback mechanism involves routing replies according to the rules for forwarding requests.

For the avoidance of doubt, a "recursive" routing mechanism is considered to be a mechanism that involves forwarding a reply message from a destination node to a source node back along the path that was taken by the request that initiated the reply. Each node in the path may maintain a state for the request, identifying the node from which the request was received.

The routers of a typical overlay network may be considered "super-routers", each super-router maintaining a routing table mapping a set of overlay network addresses to IP addresses and port numbers. In the event that a super-router in the recursive reply forwarding path, or a link to that router, fails, the preceding super-router in the path applies the fallback mechanism by identifying the next hop super-router from its overlay routing table.

Failure of a super-router or link may be detected by the lack of an acknowledgement in respect of a forwarded reply message or as a result of some ongoing monitoring function.

This technique is applicable in particular to peer-to-peer networks and in particular, though not necessarily, to peer-to-peer SIP networks such as might be used to set up a voice call.

It may be advantageous to include within the request and reply messages a transaction identifier that includes a fixed part, e.g. generated by the source, and a variable part that is updated at each super-node upon receipt. In the event that the reply is routed using the recursive mechanism, the variable or hop-by-hop part allows each receiving router to identify the next hop router. However, in the event of a failure as considered above, whereby the reply is routed via an alternative path, the fixed part allows the source to link the reply to the request.

In order to avoid a super-router receiving a reply, following failure detection, from dropping the reply, the super-router detecting the failure preferably tunnels the reply to the next-hop super-router by including the reply as a payload within a new request addressed to the source super-router. Upon receipt of the packet at the source, the payload is extracted and matched to the correct transaction.

A router embodying the functionality may be implemented as an appropriately programmed computer. For example, the computer may be a mobile phone, smart phone, PDA, laptop computer, or a desktop computer. The computer may alternatively be a network server.

BRIEF DESCRIPTION OF THE DRAWINGS

FIG. 4 is a diagram illustrating the structure and/or function of the node of FIG. 3; and FIG. 5 is a diagram illustrating the structure of a request or reply data packet.

DETAILED DESCRIPTION $R^3$ minimizes the effects of intermediate node failure on the performance of the overlay network by delegating the responsibility for failure recovery to nodes along the routing path. This can considerably speed up the process of recovering from an intermediate node failure.

Figure 1:
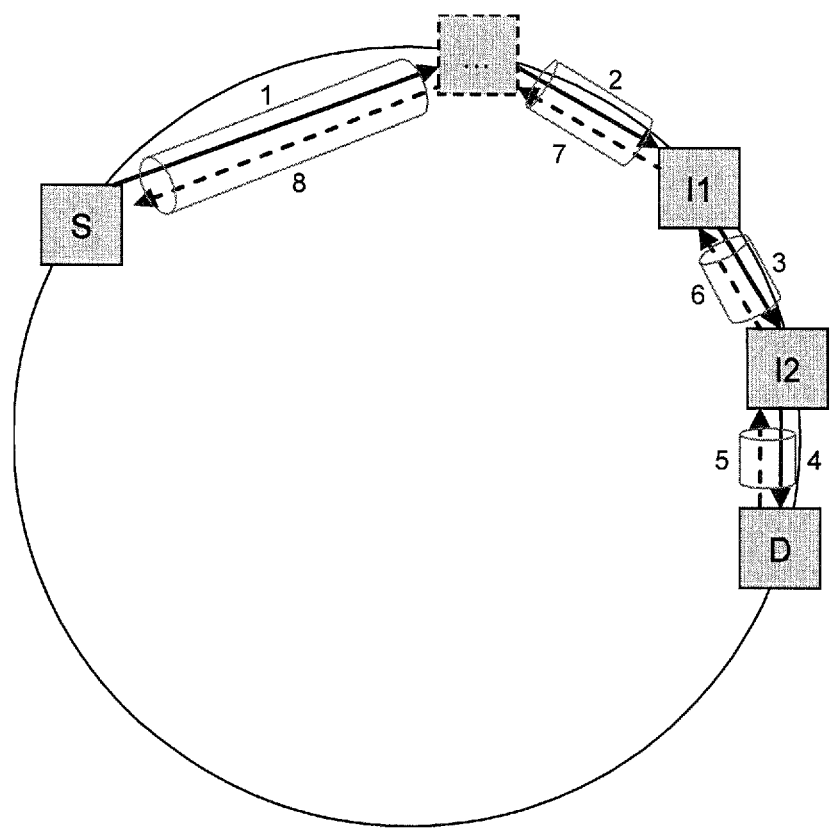
FIG. 1 is a diagram illustrating a recursive routing model of a known overlay network.
Figure 2:
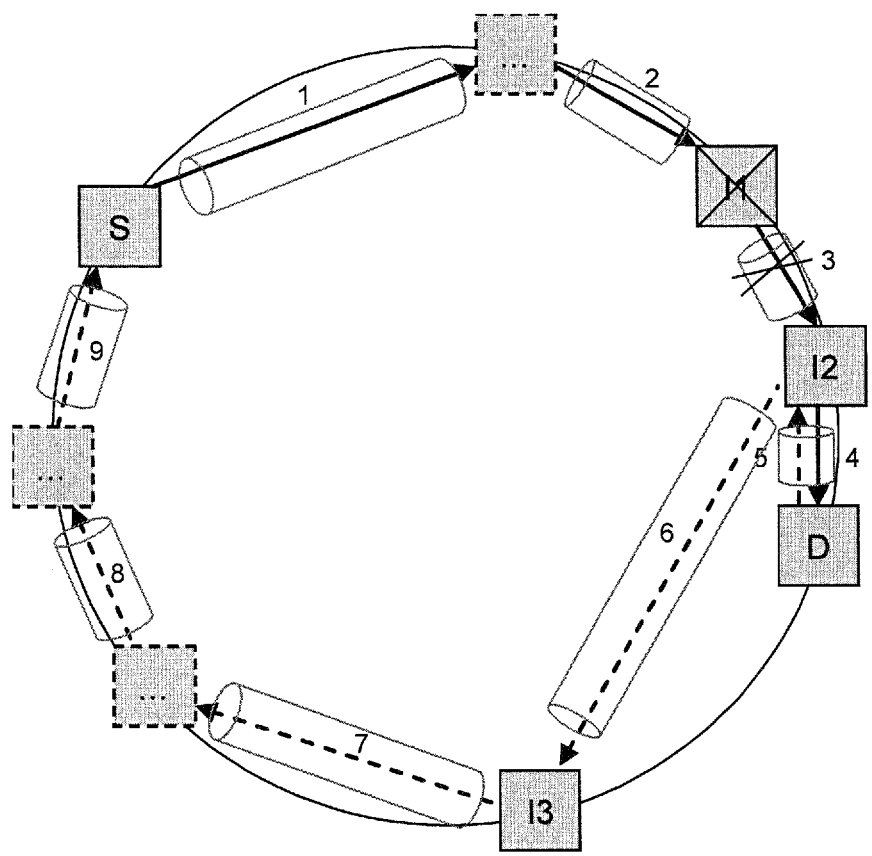
FIG. 2 is a diagram illustrating an overlay network constituting an embodiment of the invention.

The $R^3$ mechanism is illustrated in FIG. 2, where the originator of a request message is a source S and the destination is the destination D. In the figure, one intermediate node, I1, becomes unreachable after it has forwarded the request to another intermediate node, I2. As already mentioned, there can be various reasons for unreachability of a node, for example batteries have run out, operating system has crashed, or connectivity has been lost (e.g. due to node mobility). Also, instead of becoming unreachable, node I1 may simply decide to leave the overlay gracefully soon after having forwarded the request, meaning that it is no longer available when the reply should be forwarded. In any of these scenarios, node I2 would benefit from an alternative way to forward the reply (instead of just trying to forward it via the failed node I1). This is the core idea of $R^3$; $R^3$ enables the node I2 to find a different path through the overlay for forwarding the reply if it has noticed that the next hop along the path towards the node S has failed. Any suitable mechanism for detecting connection breakages may be used and examples of suitable known mechanisms include polling, timeouts, and end of stream indications. In FIG. 2, the node I2 uses traditional overlay routing for forwarding the reply. That is, I2 uses the same kind of overlay routing that is used for routing requests: I2 performs a node lookup operation in its local routing table to find the best next hop node on the path towards node S. I2 already has an existing connection to I3 (in other words I3 is on I2's overlay routing table) and it can easily forward the reply to I3. I3 in its turn also applies traditional overlay routing for the reply and before long the reply will reach the source node.

The steps in FIG. 2 are as follows:
1. The source node S wishes to send a request to the destination node D. To route the request, the node S searches its local routing table to find the best next hop node (that is, a node whose identifier is closest to the identifier of the destination node D according to a proximity metric used by the DHT). The node S sets the transaction identifier of the request using the mechanism described herein.
2. Each intermediate node along the path towards the destination node D in turn performs a search similar to the one in the step (1) in its local routing table to find the best next-hop node (that is, a node whose identifier is closest to the identifier of the destination node D according to the proximity metric used by the DHT).
3. The node I1, which is the second-last intermediate node to forward the request, also performs the procedure described in the step (2).
4. The node I2, which is the last intermediate node to forward the request, also performs the procedure described in the step (2).
5. Finally, the request reaches the destination node D. The destination node D generates a reply to the request and sends it to the node I2. The details of this procedure are described below.
6. The intermediate node I2 receives the reply. Because the intermediate node I1 is no longer reachable, the node I2 uses the procedure described below to find a new route for the reply. The next hop on this route is a node I3. Instead of sending the reply as it is, the node I2 needs to tunnel the reply through the overlay by placing it in the payload of a new request.
7. The Node I3 uses overlay native (DHT-specific) routing to route the reply to the next intermediate node.
8. Each intermediate node along the path towards the node S uses the DHT-specific routing procedure to find the next hop node.
9. Finally, the reply reaches the node S. The node S can map the reply to the original request by using the procedure described below.

As can be seen from FIG. 2, $R^3$ can speed up recovery from intermediate node failure considerably. Without $R^3$, the node S would wait for its transaction tinier to fire before resending the request. In the case of P2PSIP, this has the effect of directly increasing the session setup delay. Further, even the retransmitted request might fail if the overlay routing has not yet managed to recover from the failure of the node I1, which would increase the session setup delay even more. However, when using $R^3$, there would be no need to retransmit the request since the reply would with a high probability be able to reach the node S through the alternative path before the transaction timer at the node S fires.

Identifying Replies Forwarded Using $R^3$

The common mechanism to map replies to requests is to use transaction identifiers. Transaction identifiers are carried in requests and replies. When receiving a reply, a node uses the transaction identifier carried in the reply to map the reply to a previously sent request. Existing overlay networks typically use transaction identifiers in two different ways:
1. Each intermediate node forwards the transaction identifier unmodified. That is, the same transaction identifier is used end-to-end.
2. Each intermediate node generates a new transaction identifier for the request it forwards. That is, the scope of the transaction identifier is a single hop in the overlay.

The problem with the first approach is that it is not possible to tell the difference between retransmitted requests and requests that are looping in the network. This is because both types of requests carry the same transaction identifier. However, the benefit of this approach is that it works directly with $R^3$ since, even if the reply follows a different path through the network from the request, replies can still be mapped to the correct request at the node that initiated the request/reply transaction.

In the case of the second approach, a request and its associated reply will have different transaction identifiers if the reply follows a different path through the network from the request. This poses a problem for $R^3$; when receiving the reply routed using $R^3$, the node S (i.e. the original sender of the request) would not be able to associate the reply with the request, provided that nodes store soft state. If the first approach is used, then this problem does not exist.

$R^3$ solves the problem with the second approach by using two types of transaction identifiers: an end-to-end transaction identifier and a hop-by-hop transaction identifier. The end-to-end transaction identifier is generated by the original sender of the request (the node S in FIG. 2). Each intermediate node forwards the end-to-end transaction identifier unmodified, but generates a new hop-by-hop transaction identifier in the usual manner. The destination node (the node D in FIG. 2) copies the end-to-end transaction identifier to the reply it generates, and each intermediate node forwards the end-to-end transaction identifier in the reply unmodified. If the reply follows a different path through the network from that which the request followed (due to $R^3$ procedures), then the end-to-end transaction identifier allows the node S to associate the reply with the correct request.

Introducing another transaction identifier means that a new field would be needed in peer-to-peer protocol messages. However, this can be avoided, since $R^3$ allows one to split the existing transaction identifier field carried in peer-to-peer protocol messages into two parts: a prefix and a suffix. The prefix is generated by the original sender (node S) of the request and it identifies the transaction in an end-to-end manner; each intermediate hop forwards the prefix unmodified and the node ID, when generating the reply, copies the prefix into the transaction identifier of the reply. The suffix is used as the hop-by-hop transaction identifier and each intermediate hop can freely modify it before forwarding the message.

Tunneling of Replies Forwarded Using $R^3$

As already explained, $R^3$ routes replies as if they were requests. In FIG. 2, the node I2 uses $R^3$ to forward a reply to the node I3, which has never seen the request to which the reply is being sent. Because the node I3 has never seen the request, it cannot associate the reply with any existing transaction (the hop-by-hop transaction identifier or the end-to-end transaction identifier, or both, are different), and may thus simply choose to drop the reply. To avoid this problem, $R^3$ allows the intermediate node making the decision to initiate $R^3$ procedures (the node I2 in FIG. 2) to tunnel the reply through the overlay. This means that the reply is carried in the payload of a new request targeted to the node that initiated the transaction to which the reply is related (i.e. the node S in FIG. 2). When the node S receives the request carrying the tunneled reply, it extracts the reply from the payload of the request and uses the end-to-end transaction identifier carried in the reply to map the reply to the correct transaction. This mechanism does not require additional processing at intermediate nodes, since only the target node (the node S) of the request carrying the tunneled reply needs to check the payload. Intermediate nodes only need to forward the request and can ignore the payload.

Figure 3:
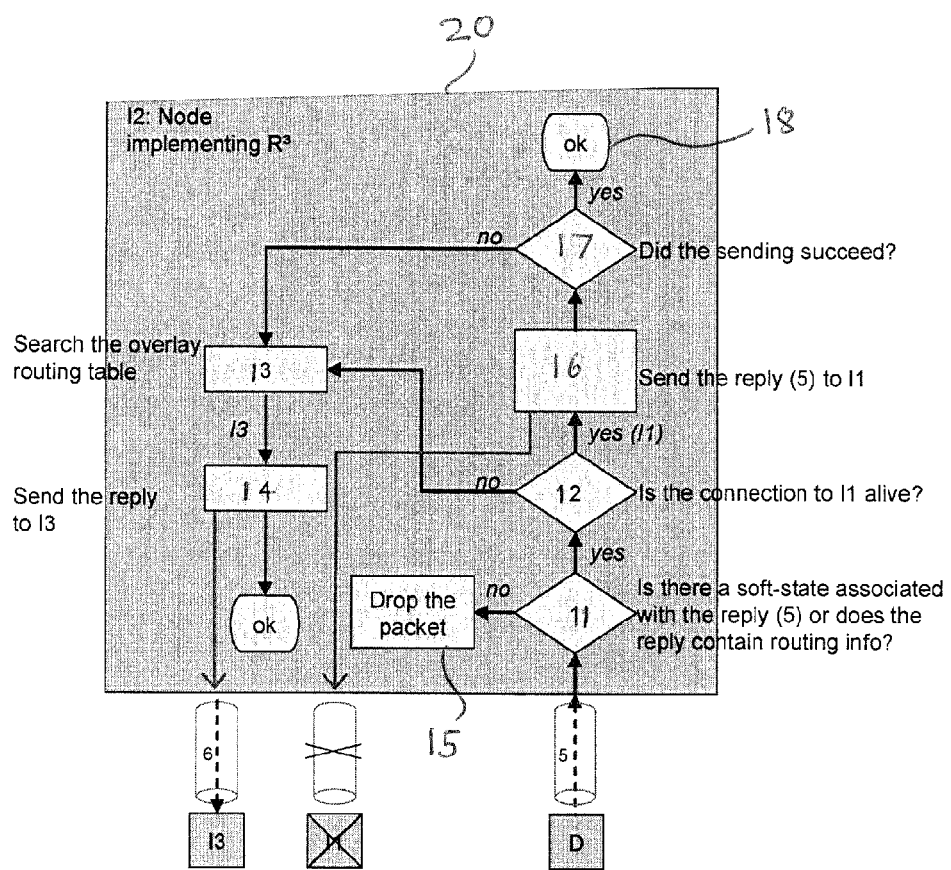
FIG. 3 is a diagram illustrating part of an overlay network node of the network of FIG. 2 constituting an embodiment of the invention.

$R^3$ Processing within an Overlay Network Node $R^3$ specific processing taking place within an overlay network node is illustrated in FIG. 3. The processing is described from the viewpoint of the node I2 of FIG. 2

The large dark gray coloured box 20 of FIG. 3 represents the node I2. In the bottom right corner, the node I2 has received a reply from the node D (this step corresponds to the step 5 of FIG. 2).

1. As described hereinbefore, traditional reply routing in overlay networks is based either on a soft state stored at each intermediate node or on routing information included in the reply. If routing of replies is based on soft states, then the reply is sent to the IP address and port from which the request was received. If routing is based on routing information carried in the reply, the intermediate node forwarding the reply picks up the next hop entry in the list of intermediate hops included in the reply and sends the reply to the specified IP address and port. In FIG. 3, after having received the reply in the step (1), the node I2 first checks (11) whether it has enough information available to route the reply. Thus, the node I2 either attempts to fetch the soft state stored when the request was received or uses the routing information carried in the reply. If the reply does not contain routing information or if the node I2 fails to find any soft state associated with the reply, it drops the reply (15).
2. Next, the node I2 checks (12) whether the connection it has with the next upstream intermediate node, I1, is still alive. Depending on whether the connection is alive or not, node I2 proceeds to one of the two steps below:
   a. If the node I2 believes that the connection to the node I1 is still alive, it tries (16) to forward the message on that connection. If the node I1 is still reachable, it returns an acknowledgement to the reply. In this way, the node I2 learns (17) that the reply was received and thus no further processing is needed (18). If, however, no acknowledgement is received, the node I2 assumes that the node I1 has left the overlay network and continues to a step (13).
   b. If the node I2 has already learned before receiving the reply that the intermediate node I1 has left the network, it continues to the step (13). The node I2 may have learned this through several ways, for example: from a failed keep-alive or other failed periodic maintenance message it attempted to send; from a closed TCP connection (note that this only works for TCP); or the node I1 may simply have informed the node I2 of its departure if it has left the network gracefully.
3. Because the node I2 now knows that the node I1 has become unreachable, it has to find an alternative path for the reply. Therefore, the node I2 uses the identifier of node S (the intended recipient of the reply) to perform (13) a lookup operation in its local routing table. This identifier is carried in the reply, and is a hash value (e.g. a 160-bit Secure Hash Algorithm One (SHA-1) hash). The lookup determines the remote node, in routing table of the node I2, whose identifier is closest to that of the node S. "Closeness" is determined by the DHT-specific proximity metric. In FIG. 3, the remote node closest to node D is the node I3.
4. The node I2 forwards (14) the reply to the node I3. The reply is tunnelled, that is, sent within the payload of a new request as has already been described.

The $R^3$ mechanism has a number of advantages over the existing solutions. The main advantages are the following:

It has been developed from the beginning for environments where intermediary nodes may be non-robust. Thus, it is well-suited to environments where all or part of the nodes in the overlay are mobile terminals (such as 3G terminals). In such environments, endpoints may wander out of coverage from time to time causing connectivity breakages in the overlay.

It is suitable for environments with NAT devices, such as the Internet.

The failure recovery is very efficient. $R^3$ minimizes the effects of intermediate node failure on the performance of the overlay network by delegating the responsibility for failure recovery to nodes along the routing path. This can considerably speed up the process of recovering from an intermediate node failure.

Since it allows a fast recovery from intermediate node failures, $R^3$ can considerably reduce session establishment delay in P2PSIP networks which such errors occur.

$R^3$ can also be used to optimize routing performance even if all the intermediary nodes would be reachable.

$R^3$ can be used with most overlay routing technologies and DHT algorithms. Furthermore, the utilization of the $R^3$ mechanism can be easily detected by examining the communication patterns between nodes.

FIG. 4 is a structural/functional diagram illustrating any one of the nodes shown in FIG. 2. The node is embodied as a programmed computer comprising a processor 30, a memory 31 and an input/output interface 32 connected at 33 to the rest of the network. The memory 31 comprises a read-only memory containing a program for controlling the operation of the processor 30, together with volatile and non-volatile memory as necessary for the functioning of the processor 30. The interface 32 provides all of the interfacing functions necessary for the processor 30 to communicate with the remainder of the network.

The processor 30 is illustrated as comprising a plurality of functional units or "functions" 34 to 37 together with a local routing table 38 including part of the distributed hash table. These units represent functional units within the software controlling the processor 30 and illustrate the functions and data flows within the processor 30.

The node shown in FIG. 4 is capable of generating requests, forwarding requests, performing the $R^3$ function and generating replies to requests. When generating a request, the request generating function 34 is used. The function 34 generates the request typically as a data packet, for example having the general structure illustrated in FIG. 5. Each packet comprises header/addressing data illustrated at 40 to allow the packet to be transported by lower-level network functions. The packet also comprises a transaction identifier generated by the function 34 and comprising a fixed portion 41 and a non-fixed portion 42. The packet further comprises a payload 43 in accordance with the nature or function of the request.

The fixed portion 41 of the transaction identifier represents end-to-end data specifying, for example, the addresses of the source node which created the request and of the destination node for which the request is destined. The non-fixed portion 42 comprises hop-by-hop address data, for example specifying the node which forwarded the request to the current node.

When the request generating function 34 has generated the request, it accesses the local routing table 38 in order to direct the request to an intermediate node whose address is within its local routing table 38 and which is nearest the destination node. As described hereinbefore, the table 38 is associated with or contains a proximity metric to allow the nearest available node to be selected as the intermediate destination for the request.

When the node shown in FIG. 4 receives a request for forwarding, the request/reply forwarding function 35 receives the request and forwards it as described hereinbefore. In particular, the fixed part 41 of the transaction identifier and the payload 43 are not changed and need not be processed by the function 35, which forwards these portions of the request. The non-fixed portion 42 of the identifier is updated to represent the latest hop of the request. The function 35 interrogates the local routing table 38 to determine the node nearest the destination node and forwards the request as described hereinbefore.

When the node shown in FIG. 4 is the destination node, it determines that it is the destination for the request, for example by examining the fixed portion 41 of the transaction identifier. The reply generating function 37 is then performed and generates a reply destined for the source node. The reply has the same structure as the request as illustrated in FIG. 5 and contains the appropriate fixed and non-fixed portions of the transaction identifier and a payload 43 as appropriate. The function 37 determines the node which last forwarded the request to the destination node and sends the reply back to the "previous node".

When the node shown in FIG. 4 is acting as an intermediate node returning the reply recursively towards the source node, the function 35 receives the reply and checks whether the preceding node in the recursive chain is still available in the sense that it is still accessible. If the preceding node is accessible, then the function 35 forwards the reply to the preceding node after updating the non-fixed part 42 of the transaction identifier as appropriate.

When the preceding node is no longer available, the $R^3$ function 36 is performed. As described hereinbefore, the function 36 determines an alternative node towards the source node which is accessible. The non-fixed portion 42 of the transaction identifier is updated appropriately. However, instead of returning the reply as a reply, the function 36 reformulates it as a request by placing the reply data in the payload 43 so that the nodes which subsequently receive the reply forward it and do not drop it.

The invention claimed is:

1. An overlay network node, comprising:
   first means for forwarding, from a preceding node of an overlay network, a request originating in a source node of the overlay network and destined for a destination node of the overlay network; and
   second means for forwarding a reply to the request, the reply originating in the destination node and destined for the source node;
   wherein the second means is arranged to forward the reply towards the source node via the preceding node when available and tunnel the reply towards the source node via another node of the overlay network, different from the preceding node, if the preceding node is unavailable, the second means being arranged to select the another node as nearest the source node according to a proximity metric of a distributed hash table; and
   wherein the second means is arranged to convert the reply into a reply of a further request destined for the source node.

2. The overlay network node as claimed in claim 1, wherein the first means is arranged to select the preceding node from the distributed hash table.

3. The overlay network node as claimed in claim 2, wherein the first means is arranged to select the preceding node as nearest the source node according to a proximity metric of the distributed hash table.

4. The overlay network node as claimed in claim 1, wherein the source node is arranged to provide a transaction identifier in the request and each of the first and second means is arranged not to change at least part of the transaction identifier representing an end-to-end path of the request and the reply.

5. The overlay network node as claimed in claim 4, wherein each of the first and second means is arranged to update a non-fixed part of the transaction identifier in accordance with a local part of a node path of the request and reply through the overlay network.

6. The overlay network node as claimed in claim 5, wherein the second means is arranged to identify the preceding node from the non-fixed part of the transaction identifier.

7. The overlay network node as claimed in claim 1, wherein the first means is arranged to store a representation of an identifier of the preceding node and the second means is arranged to identify the preceding node from the representation.

8. The overlay network node as claimed in claim 1, wherein the overlay network node comprises a router of the overlay network.

9. The overlay network node as claimed in claim 1, wherein the overlay network node comprises a network server.

10. The overlay network node in claim 1, wherein the overlay network node is part of the overlay network.

11. The overlay network node as claimed in claim 1, wherein the overlay network comprises a peer-to-peer network.

12. The overlay network node as claimed in claim 1, wherein the overlay network comprises a peer-to-peer session initiation protocol network.

13. A method of routing a reply in an overlay network node of an overlay network, comprising:
   forwarding, from a preceding node of the overlay network, a request originating in a source node of the overlay network and destined for a destination node of the overlay network;
   forwarding a reply to the request, the reply originating in the destination node and destined for the source node via the preceding node when available or tunneling the reply towards the source node via another node of the overlay network, different from the preceding node, if the preceding node is unavailable, the another node being selected as nearest the source node according to a proximity metric of a distributed hash table; and
   converting the reply into a payload of a further request destined for the source node.

14. The method as claimed in claim 13, comprising selecting the preceding node from the distributed hash table.

15. The method as claimed in claim 14, comprising selecting the preceding node as nearest the source node according to a proximity metric of the distributed hash table.

16. The method as claimed in claim 13, wherein the source node provides a transaction identifier in the request representing an end-to-end path of the request and the reply.

17. The method as claimed in claim 16, comprising updating a non-fixed part of the transaction identifier in accordance with a local part of a node path of the request and reply through the overlay network.

18. The method as claimed in claim 17, comprising identifying the preceding node from the non-fixed part of the transaction identifier.

19. The method as claimed in claim 13, comprising storing a representation of an identifier of the preceding node.

20. A non-transitory computer readable medium having stored thereon a plurality of instructions including instructions which, when executed by a processor, cause the processor to perform steps of a method of routing a reply in an overlay network node of an overlay network, comprising:

forwarding, from a preceding node of the overlay network, a request originating in a source node of the overlay network and destined for a destination node of the overlay network;

forwarding a reply to the request, the reply originating in the destination node and destined for the source node via the preceding node when available or tunneling the reply towards the source node via another node of the overlay network, different from the preceding node, if the preceding node is unavailable, the another node being selected as nearest the source node according to a proximity metric of a distributed hash table; and converting the reply into a payload of a further request destined for the source node.

\* \* \* \* \*

UNITED STATES PATENT AND TRADEMARK OFFICE
CERTIFICATE OF CORRECTION

| | |
|---|---|
| PATENT NO. | : 8,817,595 B2 |
| APPLICATION NO. | : 12/867749 |
| DATED | : August 26, 2014 |
| INVENTOR(S) | : Hautakorpi et al. |

It is certified that error appears in the above-identified patent and that said Letters Patent is hereby corrected as shown below:

In the Specification

In Column 1, Line 66, delete "Internet." and insert -- Internet --, therefor.

In Column 7, Line 42, delete "tinier" and insert -- timer --, therefor.

In the Claims

In Column 12, Line 22, in Claim 10, delete "node" and insert -- node as claimed --, therefor.

Signed and Sealed this
First Day of September, 2015

Michelle K. Lee
*Director of the United States Patent and Trademark Office*